(12) United States Patent
Okahara et al.

(10) Patent No.: US 7,304,455 B2
(45) Date of Patent: Dec. 4, 2007

(54) POWER GENERATION CONTROLLER

(75) Inventors: Hideto Okahara, Kariya (JP);
Tadatoshi Asada, Anjo (JP)

(73) Assignee: Denso Corporation, Kariya (JP)

( * ) Notice: Subject to any disclaimer, the term of this patent is extended or adjusted under 35 U.S.C. 154(b) by 81 days.

(21) Appl. No.: 11/378,279

(22) Filed: Mar. 20, 2006

(65) Prior Publication Data
US 2006/0214644 A1    Sep. 28, 2006

(30) Foreign Application Priority Data
Mar. 23, 2005    (JP) .............................. 2005-084846

(51) Int. Cl.
*H02P 9/10* (2006.01)
(52) U.S. Cl. .............................. 322/28; 322/59; 322/29
(58) Field of Classification Search ............... 322/22, 322/27, 28, 36, 37, 29, 59, 99
See application file for complete search history.

(56) References Cited

U.S. PATENT DOCUMENTS

| | | | |
|---|---|---|---|
| 4,598,373 A * | 7/1986 | Morishita et al. .............. | 701/1 |
| 5,481,176 A * | 1/1996 | DeBiasi et al. ................ | 322/7 |
| 5,625,276 A * | 4/1997 | Scott et al. .................... | 322/24 |
| 5,629,606 A * | 5/1997 | Asada .......................... | 322/28 |
| 5,767,636 A | 6/1998 | Kanazawa et al. | |
| 5,880,577 A * | 3/1999 | Aoyama et al. .............. | 322/29 |
| 6,476,571 B1 * | 11/2002 | Sasaki ......................... | 318/139 |
| 6,483,277 B1 * | 11/2002 | Harmon ........................ | 322/28 |
| 6,534,959 B1 * | 3/2003 | Anderson et al. ............. | 322/28 |
| 6,548,990 B2 * | 4/2003 | Okuno et al. ................. | 322/36 |
| 6,954,052 B2 * | 10/2005 | Fujita et al. .................. | 322/28 |
| 2005/0135133 A1 | 6/2005 | Maehara | |

FOREIGN PATENT DOCUMENTS

EP    0 725 473 A2    8/1997
JP    A 8-275407    10/1996

* cited by examiner

*Primary Examiner*—Nicholas Ponomarenko
(74) *Attorney, Agent, or Firm*—Oliff & Berridge, PLC.

(57) ABSTRACT

The power generation controller includes a control command receiving section receiving a control command transmitted from an external control unit for controlling an internal combustion engine, a control command holding section holding the control command received by the control command receiving section, and an excitation current control section controlling an excitation current of a generator driven by the internal combustion engine on the basis of the control command held by the control command holding section. The excitation current control section is configured to control the excitation current on the basis of a control command transmitted from the external control unit when the internal combustion engine is in a stopped sate.

6 Claims, 4 Drawing Sheets

POWER GENERATION CONTROLLER

CROSS-REFERENCE TO RELATED APPLICATION

This application is related to Japanese Patent Application No. 2005-84846 filed on Mar. 23, 2005, the contents of which are hereby incorporated by reference.

BACKGROUND OF THE INVENTION

1. Field of the Invention

The present invention relates to a power generation controller for controlling a generator in accordance with a control command transmitted from an external control unit.

2. Description of Related Art

It is known to regulate an output voltage of a vehicle generator driven by an engine mounted on a vehicle by use of a power generation voltage controller as disclosed in Japanese Patent Application Laid-open No. 8-275407. Such a power generation voltage controller includes a signal discriminating means connected to an engine ECU (Electronic Control Unit), a power generation voltage setting means, a voltage controlling comparator, and an excitation current controlling transistor connected to an excitation winding of a vehicle generator.

The engine ECU transmits, as a vehicle state signal containing a traveling state signal etc., a binary pulse train signal to the power generation voltage controller. The binary pulse train signal transmitted from the engine ECU is decoded into a traveling state signal etc. by the signal discriminating means of the power generation voltage controller. The signal discriminating means holds the decoded traveling state signal etc. until it next receives the vehicle state signal. The power generation voltage setting means determines a target power generation voltage on the basis of the traveling state signal etc. held in the signal discriminating means. The determined target power generation voltage is compared with a battery voltage in the voltage controlling comparator. The excitation current controlling transistor is on/off controlled in accordance with the comparison results in the voltage controlling comparator to control the flow of the excitation current.

Generally, the vehicle generator is located, together with the power generation voltage controller, in the vicinity of the vehicle engine which drives the vehicle generator. Accordingly, there has been a possibility that noise which the vehicle engine emits from its ignition device is incorporated into the binary pulse train signal transmitted from the engine ECU to the power generation voltage controller.

It is possible to detect incorporation of the noise into the binary pulse train signal, if the pulse width of the binary pulse train signal is changed by the incorporation of the noise. However, since the power generation voltage controller cannot continue to perform the control operation on the basis of the binary pulse train signal including error, it is necessary for the power generation voltage controller to perform the control operation on the basis of the previously received binary pulse train signal, or to change to internal control mode when the power generation voltage controller detects error in the received binary pulse train signal. This prevents the power generation voltage controller from performing optimum control.

Furthermore, in a case where error in the binary pulse train signal due to the noise cannot be detected, there is a problem in that the power generation voltage controller erroneoulsy controls the vehicle generator at least until it next receives the binary pulse train signal.

SUMMARY OF THE INVENTION

The present invention provides a power generation controller including:

a control command receiving section receiving a control command transmitted from an external control unit for controlling an internal combustion engine;

a control command holding section holding the control command received by the control command receiving section; and an excitation current control section controlling an excitation current of a generator driven by the internal combustion engine on the basis of the control command held by the control command holding section;

wherein the excitation current control section is configured to control the excitation current on the basis of a control command transmitted from the external control unit when the internal combustion engine is in a stopped state.

With the power generation controller of this invention configured to control the excitation current of a generator driven by an internal combustion engine on the basis of a control command transmitted from an external control unit located in the vicinity of the engine for controlling the engine when the engine is in a stopped state, it becomes possible to prevent noise emitted from the engine from mixing with the control command, to thereby improve the reliability of a vehicle generator control system.

The control command may include a gradual-excitation time command instructing a time period between start and end of a gradual-excitation control over the generator, a maximum power increase command instructing a maximum power to be generated in response to a demand of increasing output power of the generator, a gradual-excitation removal speed command instructing a rotational speed of the internal combustion engine at which the gradual-excitation control should be removed, an initial excitation duty ratio command instructing a duty ratio of the excitation current during early stages of power generating operation of the generator, an excitation current limit command instructing a maximum limit value of the excitation current, and a correction command instructing how a target output voltage of the generator prestored in the excitation current control section should be corrected depending on a temperature of the power generation controller.

The correction command may be a temperature characteristic compensation command instructing how the target output voltage should be corrected depending on a temperature of the power generation controller.

The control command receiving section may be configured to refrain from receiving a command signal transmitted from the external control unit when the internal combustion engine is in a running state.

The control command holding section may be configured to refrain from replacing a control command transmitted from the external control unit when the internal combustion engine is in a stopped state and held therein with a newly received control command transmitted from the external control unit when the internal combustion engine is in a running state.

PREFERRED EMBODIMENTS OF THE INVENTION

Figure 1:
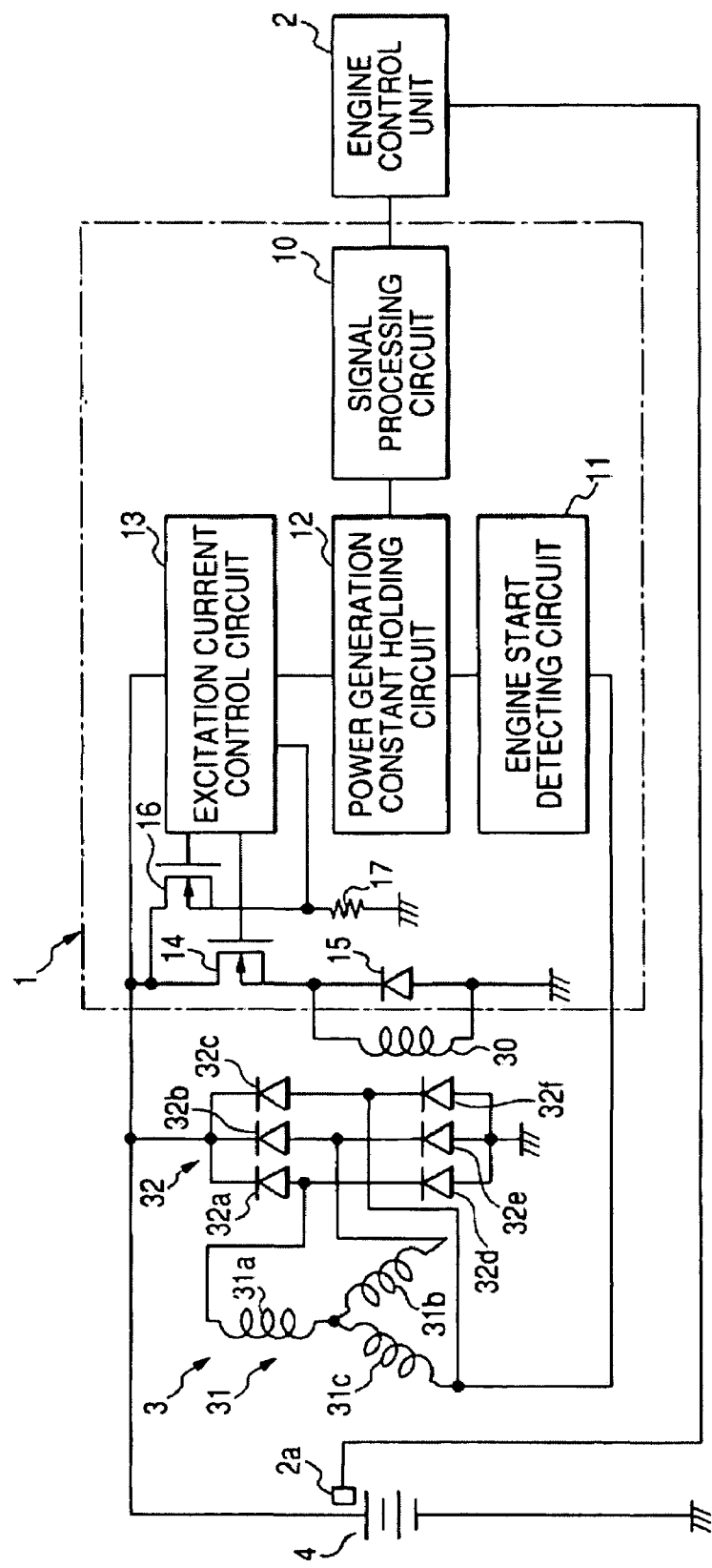
FIG. 1 is a block diagram showing a structure of a power generation controller according to an embodiment of the invention.

FIG. 1 is a block diagram showing a structure of a power generation controller 1 according to a first embodiment of the invention, which is used for controlling a vehicle generator driven by a vehicle internal combustion engine.

As shown in FIG. 1, the power generation controller 1 is connected to an engine control unit 2, vehicle generator 3, and a vehicle battery 4.

The engine control unit 2 operates to control the vehicle engine on the basis of characteristic values (velocity, acceleration, etc.) received from various sensors mounted on the vehicle. The engine control unit 2 also operates to generate a control command and transmits it to the power generation controller 1 in the form of a pulse train signal through a signal cable 2b. The engine control unit 2 is connected to a temperature sensor 2a detecting the temperature of the vehicle battery 4.

The control command includes a gradual-excitation time command, a maximum power increase command, a gradual-excitation removal speed command, an initial excitation duty ratio command, an excitation current limit command, and a temperature characteristic compensation command.

If the value of the excitation current of the vehicle generator 3 changes abruptly, since the driving torque of the vehicle generator 3 also changes abruptly, the behavior of the vehicle engine becomes unstable when the rotational speed of the vehicle engine is low. Accordingly, the so called "gradual-excitation control" is performed to prevent the driving torque of the vehicle generator 3 from changing abruptly by gradually changing the value of the excitation current.

The gradual-excitation time command is a command instructing a time period between the start and end of the gradual-excitation control. The maximum power increase command is a command instructing a maximum power to be generated in response to a demand of increasing output power.

When the rotational speed of the vehicle engine becomes sufficiently high, the behavior of the vehicle engine does not become unstable even when the driving torque of the vehicle generator 3 is changed abruptly. The gradual-excitation removal speed command is a command instructing a rotational speed of the vehicle engine at which the gradual-excitation control should be removed.

The flow of the excitation current is controlled by the switching operation of an FET (Field-Effect Transistor) 14 (to be described later) of the power generation controller 1. During the early stages of the power generating operation of the vehicle generator 3, it is necessary to supply a large amount of the excitation current to the vehicle generator 3 so that a necessary amount of electric power is generated. The initial excitation duty ratio command is a command instructing a duty ratio at which the FET 14 should operate during the early stages of the power generating operation of the vehicle generator 3. The excitation current limit command is a command instructing a maximum limit value of the excitation current for protecting the vehicle generator 3.

The temperature characteristic compensation command is a command instructing how the target output voltage pre-stored in an excitation current control circuit 13 (to be described later) should be corrected depending on the temperature of the power generation controller 1. To be more precise, the temperature characteristic compensation command is a command showing a gradient of a curve representing relationship between the target output voltage and the temperature of the power generation controller 1.

These commands are determined depending on the capacities of the vehicle generator 3 and the vehicle battery 4, the wattages of electric loads connected to the vehicle battery 4, etc. Accordingly, it is not necessary to change them regularly during control of the vehicle generator 3.

The vehicle generator 3, which is driven by a driving force transmitted from the vehicle engine through a belt, is supplied with the excitation current by the power generation controller 1 to output a DC voltage. The vehicle generator 3 includes an excitation winding 30, an armature winding 31, and a rectifier circuit 32.

The excitation winding 30, which is wound around a rotor (not shown) driven to rotate by the driving force transmitted from the vehicle engine, generates magnetic flux when the excitation current supplied from the power generation controller 1 flows through the excitation winding 30.

The armature winding 31, which is wound around a armature core (not shown) so as to form three-phase coils 31a, 31b, and 31c, generates a three-phase AC voltage by the linkage with the magnetic flux generated by the excitation winding 30. The open ends of the three-phase coils 31a, 31b, 31c are connected to the rectifier circuit 32. The open end of the three-phase coil 31c is also connected to the power generation controller 1.

The rectifier circuit 32, which operates to full-wave rectify the three-phase AC voltage generated by the armature winding 31 to generate the DC voltage, includes six diodes 32a to 32f that are three-phase bridge-connected. The cathodes of the higher side diodes 32a to 32c are connected to the power generation controller 1 and to the positive terminal of the vehicle battery 4 whose negative terminal is grounded. The anodes of the lower side diodes 32d to 32f are grounded to a vehicle body. The connection point between the diode 32a and the diode 32d, the connection point between the diode 32b and the diode 32e, and the connection point between the diode 32c and the diode 32f are connected to the open ends of the phase coils 31a, 31b, 31c, respectively.

The power generation controller 1 serves to regulate the output voltage of the vehicle generator 3 by controlling the flow of the excitation current of the vehicle generator 3 on the basis of the control command which the engine control unit 2 transmits as needed, and the values of the output voltage and the excitation current of the vehicle generator 3. The power generation controller 1 includes a signal processing circuit 10, an engine start detecting circuit 11, a power generation constant holding circuit 12, the excitation current control circuit 13, the FET 14, a flywheel diode 15, an FET 16, and an excitation current detecting resistor 17.

The signal processing circuit 10, which is connected to the output terminal of the engine control unit 2 at the input terminal thereof and to the power generation constant holding circuit 12 at the output terminal thereof, operates to receive the control command in the form of a pulse train signal which the engine control unit 2 transmits as needed, and decodes it to corresponding digital data.

The engine start detecting circuit 11 connected to the open end of the phase coil 31c at the input terminal thereof and to the power generation constant holding circuit 12 at the output terminal thereof operates to detect the start of the vehicle engine (to be more specific, the rotational speed of the vehicle engine) on the basis of a phase voltage which the phase coil 31c generates.

The power generation constant holding circuit 12, which is connected to the signal processing circuit 10 and the engine start detecting circuit 12 at the input terminals thereof and to the excitation current control circuit 13 at the output terminal thereof, operates to determine the operating state of the vehicle engine on the basis of the detection result in the engine start detecting circuit 11, and convert the digital data corresponding to the control command received by the signal processing circuit 10 into power generation constants. The power generation constant holding circuit 12 holds the power generation constants corresponding to the control command received by the signal processing circuit 10 immediately before the vehicle engine is started. Even if the signal processing circuit 10 newly receives the control command transmitted when the vehicle engine is running, the power generation constant holding circuit 12 does not convert it to new power generation constants or to replace the power generation constants last held with the new power generation constants.

The excitation current control circuit 13, which is connected to the output terminal of the power generation constant holding circuit 12, the cathodes of the diodes 32a to 32c and the excitation current detecting resistor 17 at the input terminals thereof, and connected to the gates of the FETs 14, 16, operates to generate a PWM (Pulse Width Modulation) signal for controlling the excitation current flowing into the excitation winding 30 on the basis of the output voltage of the vehicle generator 3, the value of the excitation current, and the power generation constants held in the power generation constant holding circuit 12. A value at which the target output voltage should be set when the power generation controller 1 is at a certain temperature (25 degrees C., for example) is prestored in the excitation current control circuit 13. The excitation current control circuit 13 has a function of detecting the temperature of the power generation controller 1, and correcting the value of the prestored target output voltage on the basis of the detected temperature of the power generation controller 1, and one of the power generation constants received from the power generation constant holding circuit 12, which corresponds to the temperature characteristic compensation command.

The FET 14, which serves as a switching element for on/off controlling the excitation current flowing into the excitation winding 30, has the gate connected to the output terminal of the excitation current control circuit 13, the drain connected to the cathodes of the diodes 32a to 32c and the positive terminal of the vehicle battery 4, and the source connected to one end of the excitation winding 30 the other end of which is grounded to the vehicle body.

The flywheel diode 15 connected to the one end of the excitation winding 30 at the cathode thereof and connected to the other end of the excitation winding 30 at the anode thereof operates to bypass a current generated when the FET 14 is turned off.

The FET 16, which is turned on and off in synchronization with the FET 14 to pass a current proportional to the excitation current to the excitation current detecting resistor 17, is connected to the output terminal of the excitation current control circuit 13 at the gate thereof, connected to the drain of the FET 14 at the drain thereof, and grounded to the vehicle body at the source thereof through the excitation current detecting resistor 17.

Next, the operation of the power generation controller 1 having the above described structure is explained. When an ignition key (not shown) is turned, the vehicle battery 4 is electrically connected to the power generation controller 1 and the engine control unit 2, as a result of which the power generation controller 1 and the engine control unit 2 are supplied with electric power to start their control operations. At this time, the ignition device of the vehicle engine is not yet activated, and accordingly the vehicle engine is in the stopped state.

The engine control unit 2 determines the gradual-excitation time command, maximum power increase command, gradual-excitation removal speed command, initial excitation duty ratio command, and excitation current limit command on the basis of the characteristic values (velocity, acceleration, etc.) received from the various sensors mounted on the vehicle. The engine control unit 2 also determine the temperature characteristic compensation command on the basis of the temperature of the vehicle battery 4 detected by the temperature sensor 2a. The determined commands are transmitted to the power generation controller 1 as the control command in the form of a pulse train signal.

The control command is received by the signal processing circuit 10 and decoded into corresponding digital data. At this time, the engine start detecting circuit 11 detects that the vehicle engine is in the stopped state, because the vehicle generator 3 is not driven by the vehicle engine and accordingly the phase coil 31c does not generate a voltage.

The power generation constant holding circuit 12 reconstitutes the power generation constants from the control command decoded into the digital data, and holds them, because the vehicle engine is detected to be in the stopped state by the engine start detecting circuit 11.

Figure 2:
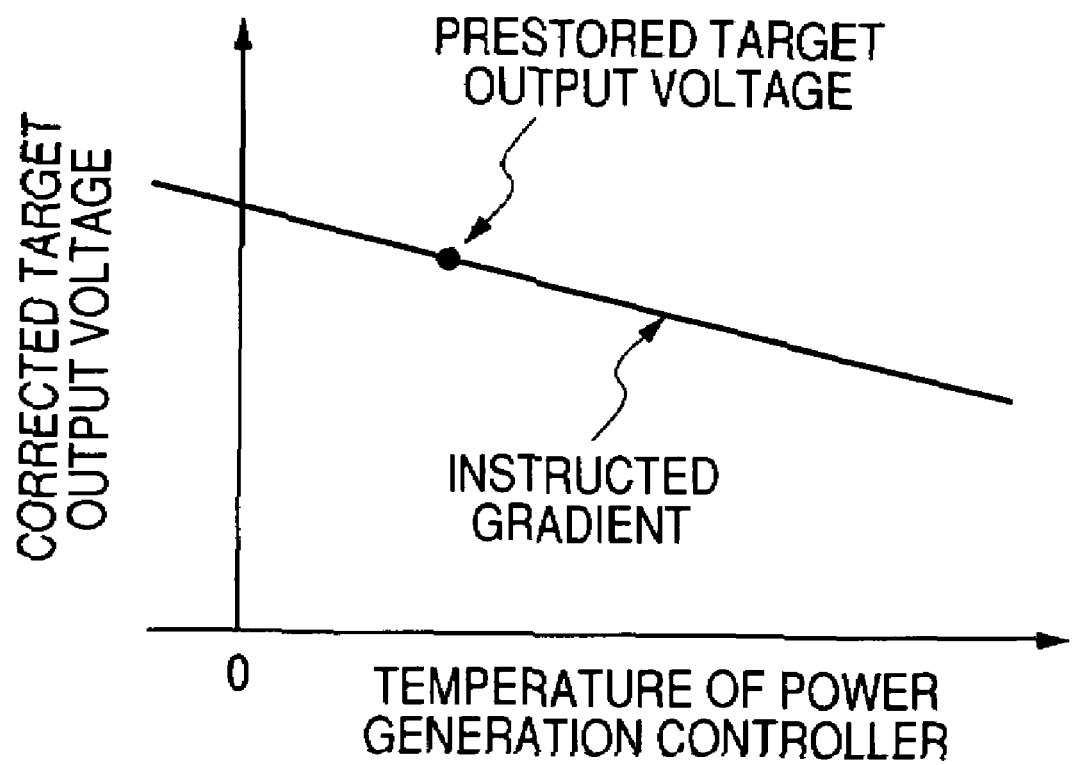
FIG. 2 is a graph showing relationship between a corrected target output voltage of a vehicle generator and the temperature of the power generation controller.

FIG. 2 is a graph showing relationship between the corrected target output voltage and the temperature of the power generation controller 1. The gradient of the curve (straight line) in this graph is determined by the power generation constant corresponding to the temperature characteristic compensation command. The excitation current control circuit 13 corrects the target output voltage prestored therein in accordance with the curve in this graph. The excitation current control circuit 13 also generates the PWM signal on the basis of the corrected target output voltage, power generation constants other than the one corresponding to the temperature characteristic compensaton command, and the value of the excitation current detected by the excitation current detecting resistor 17.

The FET 14 on/off controls the excitation current flowing into the excitation winding 30 in accordance with the PWM signal outputted from the excitation current control circuit 13. As a result, the vehicle generator 3 becomes capable of generating electric power.

After that, when the ignition key is further turned, the ignition device is activated to start the vehicle engine. In consequence, the vehicle generator starts to be driven, and the phase coil 31c starts to generate the voltage, and accordingly the engine start detecting circuit 11 detects that the vehicle engine is in the running state.

From this time on, even if the signal processing circuit 10 newly receives the control command, the power generation constant holding circuit 12 does not decode it to digital data or to replace the power generation constants last held with new power generation constants corresponding to the new data, because the power generation constant holding circuit 12 decides that the vehicle engine is in the running state on the basis of the detection result in the engine start detecting circuit 11. Accordingly, the power generation constants received by the signal processing circuit 10 immediately before the vehicle engine was started are held as they are.

Thereafter, the excitation current control circuit 13 controls the excitation current flowing into the excitation winding 30 in accordance with the power generation constants received immediately before the vehicle engine was started. The vehicle generator 3 is driven by the vehicle engine to output the DC voltage depending on the excitation current controlled by the power generation controller 1.

With the power generation controller 1 of this embodiment configured to control the excitation current on the basis of the control command received from the engine control unit when the vehicle engine is in the stopped state, it becomes possible to prevent the noise emitted from the vehicle engine from mixing with the control command, to thereby improve the reliability of the vehicle generator control system.

The gradual-excitation time command, maximum power increase command, gradual-excitation removal speed command, initial excitation duty ratio command, and excitation current limit command are determined depending on the capacitors of the vehicle generator 3 and the vehicle battery 4, the wattages of the electric loads connected to the vehicle battery 4, etc. Accordingly, it is not necessary to change the values of them regularly during control of the vehicle generator 3. Accordingly, if the power generation controller 1 once receives the temperature characteristic compensation command before starting the vehicle engine, the power generation controller 1 can correct the target output voltage prestored therein in accordance with the received temperature characteristic compensation command, and control the excitation current on the basis of the corrected target output voltage.

It is a matter of course that various modifications can be made to the above described embodiment as described below.

Figure 3:
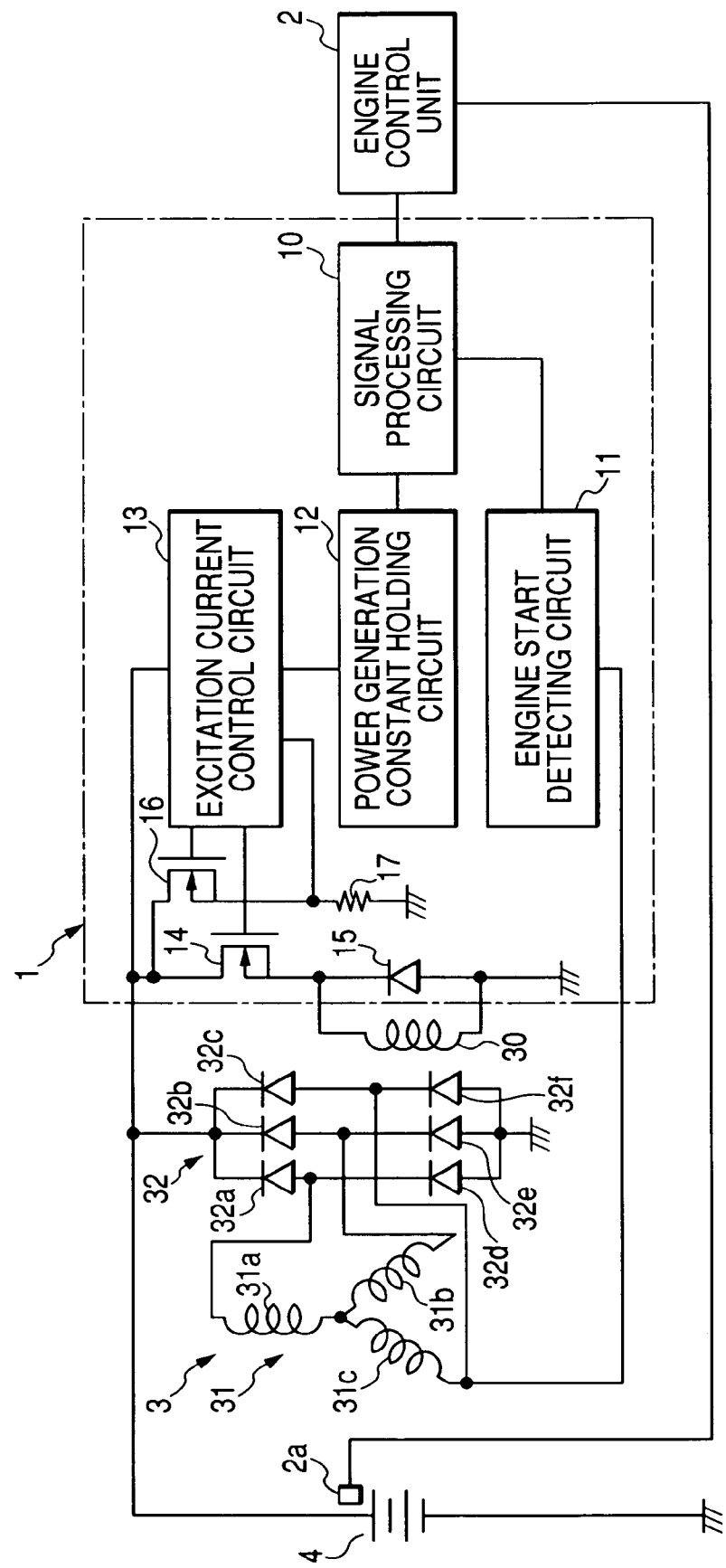
FIG. 3 is a block diagram showing a structure of a variant of the power generation controller according to the embodiment of the invention.

As shown in FIG. 3, the power generation controller 1 may be so configured that not the power generation constant holding circuit 12 but the signal processing circuit 10 decides whether the engine is in the stopped state or the running state on the basis of the detection result in the engine start detecting circuit 11, and the signal processing circuit 10 receives the control command only when the vehicle engine is decided to be in the stopped state by the engine start detecting circuit 11.

Figure 4:
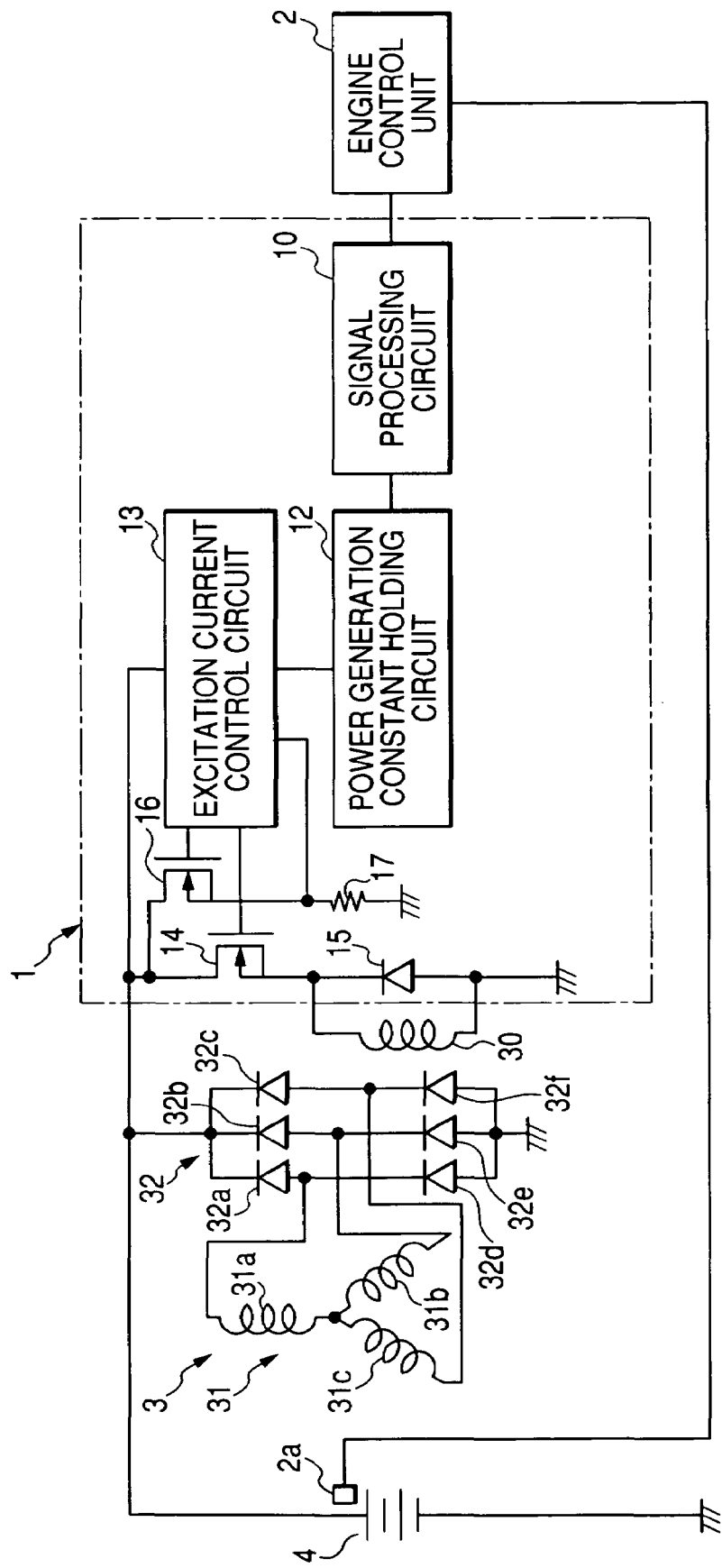
FIG. 4 is a block diagram showing a structure of another variant of the power generation controller according to the embodiment of the invention.

Also, as shown in FIG. 4, the engine start detecting circuit 11 may be removed if the engine control unit 2 has a function of deciding whether the vehicle engine is in the stopped state or the running state. In this case, the signal processing circuit 10 may be configured to receive the control command only when the vehicle engine is decided to be in the stopped state by the engine control unit 2.

Although the power generation controller 1 of this embodiment is described as being constituted by discrete circuit elements and logic circuits, at least one of the signal processing circuit 10, engine start detecting circuit 11, power generation constant holding circuit 12, and excitation current control circuit 13 may be a microcomputer based device.

The above explained preferred embodiments are exemplary of the invention of the present application which is described solely by the claims appended below. It should be understood that modifications of the preferred embodiments may be made as would occur to one of skill in the art.

What is claimed is:

1. A power generation controller comprising:
    a control command receiving section receiving a control command transmitted from an external control unit for controlling an internal combustion engine;
    a control command holding section holding said control command received by said control command receiving section; and
    an excitation current control section controlling an excitation current of a generator driven by said internal combustion engine on the basis of said control command held by said control command holding section;
    wherein said excitation current control section is configured to control said excitation current on the basis of a control command transmitted from said external control unit when said internal combustion engine is in stopped sate.

2. The power generation controller according to claim 1, wherein said control command includes a gradual-excitation time command instructing a time period between start and end of a gradual-excitation control over said generator, a maximum power increase command instructing a maximum power to be generated in response to a demand of increasing output power of said generator, a gradual-excitation removal speed command instructing a rotational speed of said internal combustion engine at which said gradual-excitation control should be removed, an initial excitation duty ratio command instructing a duty ratio of said excitation current during early stages of power generating operation of said generator, an excitation current limit command instructing a maximum limit value of said excitation current, and a correction command instructing how a target output voltage of said generator prestored in said excitation current control section should be corrected depending on a temperature of said power generation controller.

3. The power generation controller according to claim 1, wherein said correction command is a temperature characteristic compensation command instructing how said target output voltage should be corrected depending on a temperature of said power generation controller.

4. The power generation controller according to claim 1, wherein said control command receiving section is configured to refrain from receiving a command signal transmitted from said external control unit when said internal combustion engine is in running state.

5. The power generation controller according to claim 1, wherein said control command holding section is configured to refrain from replacing a control command transmitted from said external control unit when said internal combustion engine is in stopped state and held therein with a newly received control command transmitted from said external control unit when said internal combustion engine is in running state.

6. A power generation controller comprising:
    a control command receiving section receiving a control command transmitted from an external engine control unit for controlling a vehicle engine;

a control command holding section holding said control command received by said control command receiving section; and an excitation current control section controlling an excitation current of a vehicle generator driven by said vehicle engine on the basis of said control command held by said control command holding section;

wherein said excitation current control section is configured to control said excitation current on the basis of a control command transmitted from said external engine control unit when said vehicle engine is in stopped sate.

* * * * *